United States Patent
Amacker

(10) Patent No.: US 11,422,443 B2
(45) Date of Patent: Aug. 23, 2022

(54) GUIDED MOBILE PLATFORM WITH LIGHT PROJECTOR

(71) Applicant: Toyota Research Institute, Inc., Los Altos, CA (US)

(72) Inventor: Matthew Amacker, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1 day.

(21) Appl. No.: 16/525,763

(22) Filed: Jul. 30, 2019

(65) Prior Publication Data

US 2021/0031680 A1    Feb. 4, 2021

(51) Int. Cl.
*G03B 21/14* (2006.01)
*B60Q 1/50* (2006.01)
*G05D 1/02* (2020.01)

(52) U.S. Cl.
CPC .............. *G03B 21/145* (2013.01); *B60Q 1/50* (2013.01); *B60Q 2400/50* (2013.01); *G05D 1/021* (2013.01)

(58) Field of Classification Search
CPC .... B60Q 1/50; B60Q 2400/50; G03B 21/145; G03B 21/56; G03B 21/62; G03B 21/14; G03B 21/10; G05D 1/021
See application file for complete search history.

(56) References Cited

U.S. PATENT DOCUMENTS 5,822,023 A * 10/1998 Suman ................ B60R 11/0229
                                                                        348/837
6,053,815 A *  4/2000 Hara ....................... A63F 13/28
                                                                          434/69
6,371,767 B1    4/2002 Libby
                            (Continued)

FOREIGN PATENT DOCUMENTS

CN       1097884 A  *  1/1995  ............... G09B 9/04
CN    208766939 U  *  4/2019  ............. G09B 25/02
                            (Continued)

OTHER PUBLICATIONS

AB Dynamics, "The GST—an essential tool for developing future driver assistance technology," URL: https://www.abdynamics.com/en/products/track-testing/adas-targets/guided-soft-target (last accessed Jul. 29, 2019) 4 pages.

(Continued)

*Primary Examiner* — Magda Cruz
(74) *Attorney, Agent, or Firm* — Christopher G. Darrow; Darrow Mustafa PC

(57) ABSTRACT

A mobile platform is provided for a guided soft target. The mobile platform includes a platform base, and a drive unit that is configured to move the platform base along a ground surface. A projector assembly is provided, configured for projecting light patterns for visual display on an exterior of the guided soft target. The projector assembly may include a hardened housing defining at least one opening for projecting the light patterns. In certain aspects, the projector (Continued)

assembly is coupled to an outer surface of the platform base. In other aspects, the projector assembly may be built into, or is retractable into, an interior the platform base. The projector assembly may include a control module that is configured to be remotely controllable.

20 Claims, 7 Drawing Sheets

(56) References Cited

U.S. PATENT DOCUMENTS

| | | | |
|---|---|---|---|
| 7,025,462 B2 * | 4/2006 | Dwyer | G03B 21/10 348/E5.143 |
| 8,428,863 B2 | 4/2013 | Kelly et al. | |
| 8,428,864 B2 | 4/2013 | Kelly et al. | |
| 8,447,509 B2 | 5/2013 | Kelly et al. | |
| 8,457,877 B2 | 6/2013 | Kelly et al. | |
| 8,583,358 B2 | 11/2013 | Kelly et al. | |
| 8,589,062 B2 | 11/2013 | Kelly et al. | |
| 8,751,143 B2 * | 6/2014 | Kelly | G05D 1/0011 303/121 |
| 8,755,999 B2 | 6/2014 | Kelly et al. | |
| 8,762,044 B2 | 6/2014 | Kelly et al. | |
| 9,182,942 B2 | 11/2015 | Kelly et al. | |
| 2004/0189947 A1 * | 9/2004 | Hattori | G03B 21/58 353/13 |
| 2006/0268233 A1 * | 11/2006 | Sato | G03B 21/10 353/13 |
| 2010/0283889 A1 * | 11/2010 | Johnson | G09F 27/00 348/370 |
| 2013/0016027 A1 * | 1/2013 | Kelly | H01Q 1/088 343/882 |
| 2014/0118629 A1 * | 5/2014 | Larsen | H04N 5/66 348/744 |
| 2017/0315022 A1 | 11/2017 | Simader et al. | |
| 2018/0010984 A1 * | 1/2018 | Silberling | G08G 1/166 |
| 2018/0244313 A1 | 8/2018 | Pastrick et al. | |

FOREIGN PATENT DOCUMENTS

| | | | |
|---|---|---|---|
| DE | 10226916 A1 * | 1/2004 | G09B 9/042 |
| WO | 2018007458 A2 | 1/2018 | |
| WO | 2018009708 A1 | 1/2018 | |

OTHER PUBLICATIONS

Oxford Technical Solutions Ltd. (OXTS), "Guided soft target vehicle for ADAS testing," URL: https://www.oxts.com/customer-stories/guided-soft-target-vehicle-for-adas-testing/ (Sep. 3, 2013) (last accessed Jul. 29, 2019) 3 pages.

DRI Advanced Test Systems, "The Soft Car 360®—Global Vehicle Target (GVT)," URL: http://www.dri-ats.com/ (last accessed Jul. 29, 2019) 6 pages.

SAE International, "Development of a guided soft target for crash avoidance technology evaluation," URL: https://www.sae.org/publications/technical-papers/content/2011-01-0580/ (Apr. 12, 2011) (last accessed Jul. 29, 2019) 1 page.

Stark, A., "3D-printed foam outperforms standard materials," Lawrence Livermore National Laboratory, URL: https://www.llnl.gov/news/3d-printed-foam-outperforms-standard-materials (Apr. 27, 2016 (last accessed Jul. 29, 2019) 5 pages.

Marketing Materials from Anthony Best Dynamics Ltd., "Mk2 Guided Soft Target" online specification SP6013, Issue 2, 2 pages (Jan. 2018).

* cited by examiner

GUIDED MOBILE PLATFORM WITH LIGHT PROJECTOR

TECHNICAL FIELD

The present disclosure generally relates to guided soft targets using guided mobile platforms and, more particularly, to internal projector lighting for testing crash avoidance technologies.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. A guided soft target powered by a guided mobile platform may be utilized for testing vehicle technologies incorporated into a conventional passenger vehicle.

Guided soft targets may be designed to simulate aspects of a conventional vehicle so that a conventional passenger vehicle (or subject vehicle) may contact the guided soft target in a collision scenario. Guided soft targets may be structured to include a collapsible internal frame with an outer cover coupled to a mobile platform, assembled so that the subject vehicle may collide with the guided soft target without damage to either the mobile platform or the subject vehicle. This enables the testing of various technologies incorporated into the subject vehicle with minimal vehicle damage and no injury to personnel. In order to provide a more realistic simulation, it would be beneficial to include lighting on the guided soft target to mimic brake lights, turn signals, hazard lights, and the like. However, external illumination devices coupled to the outer cover are likely to be damaged during a collision.

Accordingly, it would be desirable for improved guided soft targets and guided mobile platforms that can be customized to simulate more realistic scenarios.

SUMMARY

This section provides a general summary of the disclosure, and is not a comprehensive disclosure of its full scope or all of its features.

In various aspects, the present teachings provide a mobile platform for a guided soft target. The mobile platform includes a platform base, and a drive unit that is configured to move the platform base along a ground surface. A projector assembly is provided, configured for projecting light patterns for visual display onto an exterior of the guided soft target. The projector assembly may include a hardened housing defining at least one opening for projecting the light patterns. In certain aspects, the projector assembly is coupled to an outer surface of the platform base. In other aspects, the projector assembly may be built into an interior the platform base, and can optionally be selectively movable between an extended use position and a retracted storage position. The projector assembly may include a control module that is configured to be remotely controllable.

In other aspects, the present teachings provide a guided soft target useful with vehicle testing. The guided soft target includes a platform base and a drive unit configured to move the platform base along a ground surface. A frame is provided, and may be removably coupled to the platform base. An outer cover is disposed over the frame such that the guided soft target resembles a vehicle. A projector assembly is provided that is configured for projecting light patterns for visual display onto an exterior of the guided soft target. In certain aspects, the frame includes a plurality of panels, with at least one panel of the plurality of panels defining an aperture. The projector assembly may be configured to project light patterns through the aperture for visual display onto the exterior of the guided soft target. In other aspects, the frame includes a plurality of translucent or transparent panels. The projector assembly may be configured to project light patterns through at least one panel of the plurality of translucent or transparent panels for visual display onto the exterior of the guided soft target.

In still further aspects, the present teachings provide methods for displaying lighting on an exterior of a guided soft target. The methods may include providing a projector assembly disposed within an interior of the soft guided target. The methods may include receiving, at a control module, instructions for directing an output display of a light pattern. The method may proceed to a step of instructing, using the control module, the projector assembly to project the light pattern for visual display onto the exterior of the guided soft target. The guided soft target may include an internal frame having a plurality of panels. Certain of the panels may be translucent or transparent, or define an aperture. The methods may include instructing the projector assembly to project the light pattern through the translucent or transparent panels, or through the aperture(s) defined in the panel.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures

DETAILED DESCRIPTION

The present teachings provide a guided soft target useful with various vehicle testing. In many aspects, the guided soft target includes a guided mobile platform that has a platform base and a drive unit configured to move the platform base, for example, along a ground surface. A frame is provided, and may be removably coupled or secured to the platform base. A soft, outer cover is generally provided disposed over the frame such that the guided soft target resembles a vehicle. The outer cover conforms to a shape of a perimeter defined by the frame. The frame and outer cover may be referred to collectively as a "sacrificial exoskeleton" because they are typically designed and coordinated to collapse upon impact, whereas the guided mobile platform is designed to generally remain structurally intact for repeated usage after a collision. In various aspects, the frame and cover can also be reassembled for reuse. The present technology provides a projector assembly within an interior area of the guided soft target that is configured for projecting light patterns for visual display on an exterior of the guided soft target. The projector assembly may be coupled to a platform base of the mobile platform, or to one or more panels of the frame. As detailed below, the light patterns can simulate headlights, turn signals, brake lights, etc. on the guided soft target.

Figure 1A:
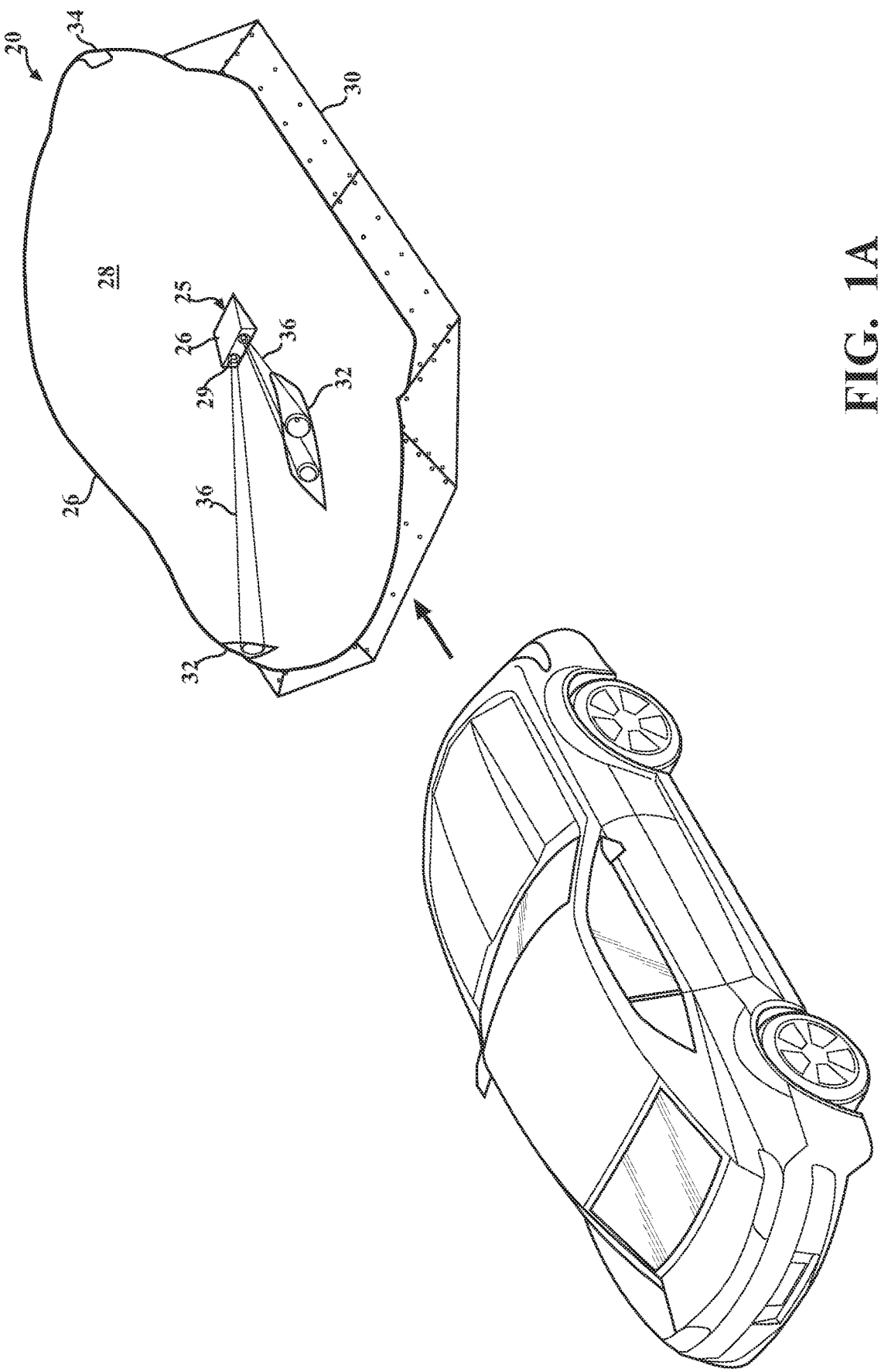
FIG. 1A is an isometric side view of a subject vehicle and a guided soft target including a mobile platform provided with a projector assembly according to various aspects of the present teachings.
Figure 1B:
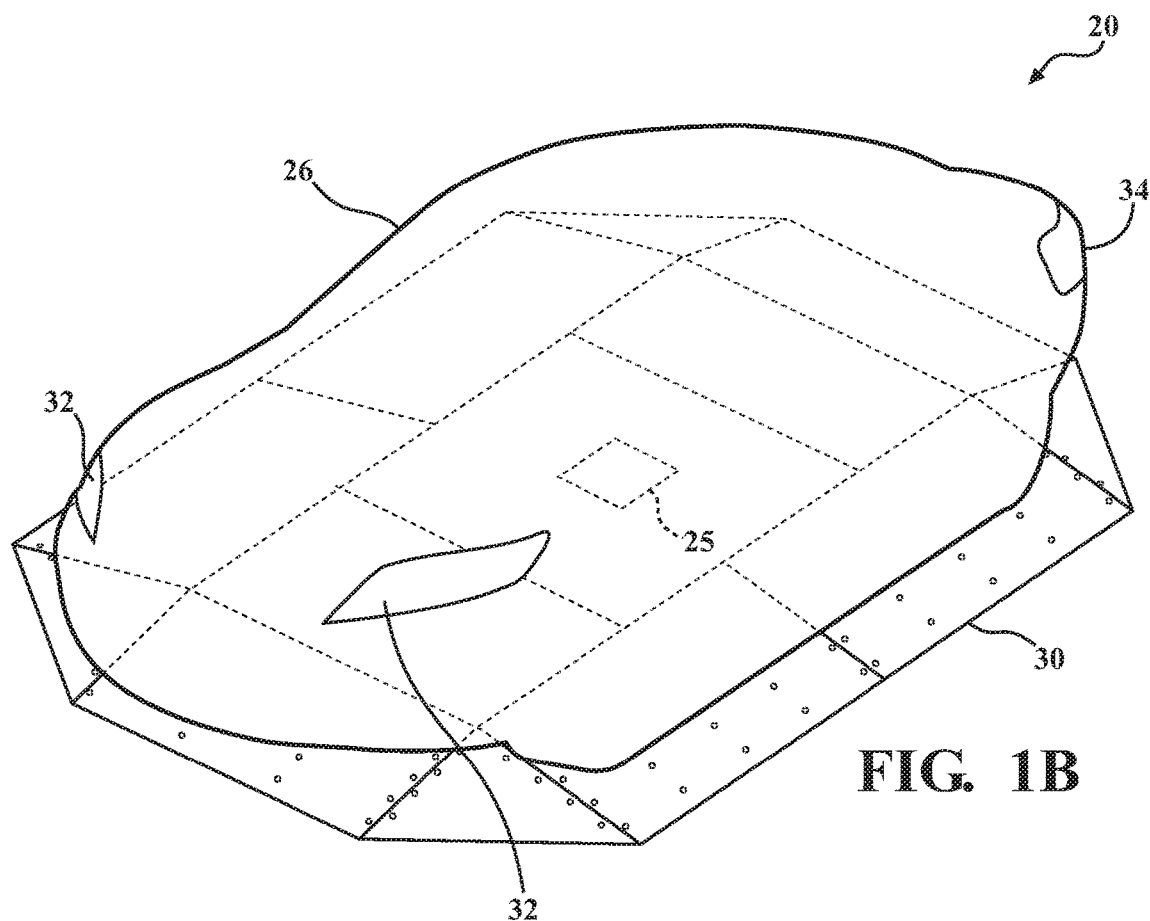
FIG. 1B is an isometric side view of the guided soft target of FIG. 1A, illustrating the mobile platform with the projector assembly in a retracted position.
Figure 1C:
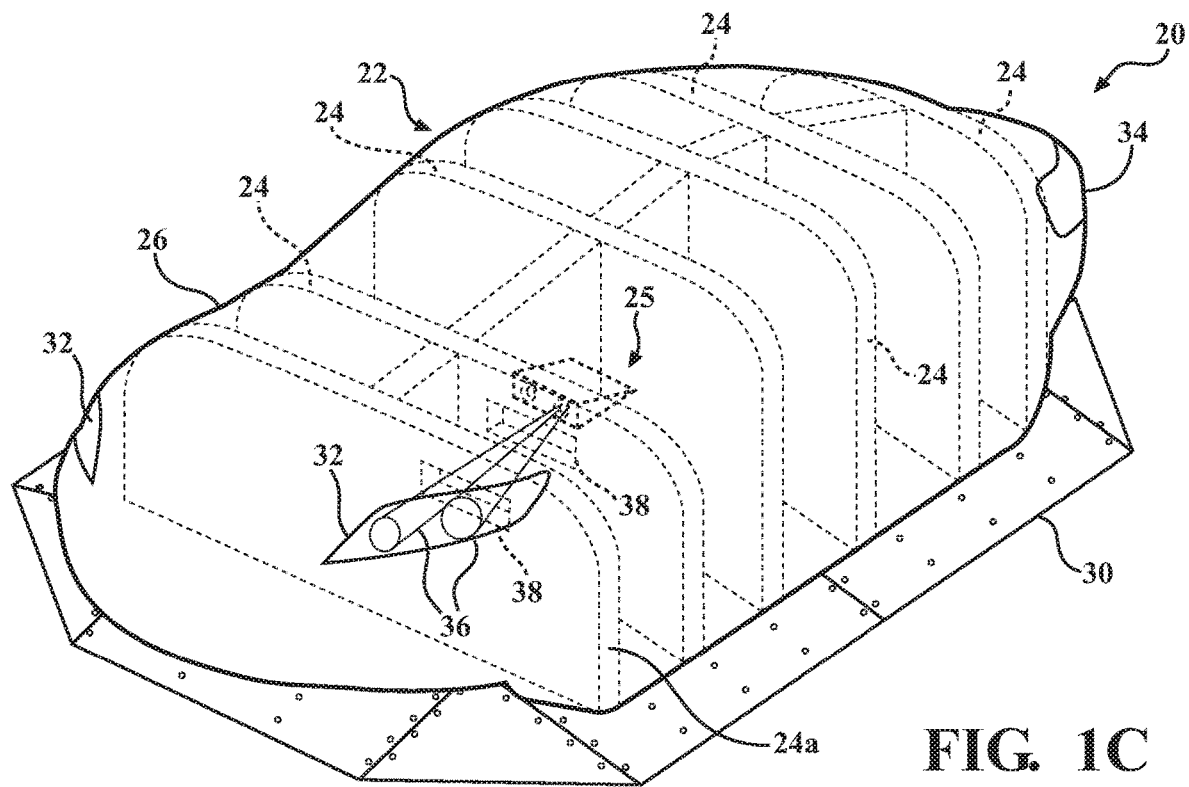
FIG. 1C is an isometric side view of the guided soft target of FIG. 1A, illustrating an internal frame to provide shape to a soft, outer cover.

FIGS. 1A-1C provide isometric side views of an exemplary guided soft target 20 according to various aspects of the present teachings. FIG. 1A illustrates a subject vehicle and a guided soft target 20 including a mobile platform 30 provided with a projector assembly 25 provided on the mobile platform 30. FIG. 1B is an isometric side view of the guided soft target of FIG. 1A, better illustrating an exemplary mobile platform 30, shown in phantom. FIG. 1C is an isometric side view of the guided soft target 20 of FIG. 1A, illustrating an internal frame 22, shown in phantom, that may be formed by a plurality of panels 24, or other suitable components/members that are disposed on a guided mobile platform 30 and ultimately provide a shape of the guided soft target 20, often resembling a vehicle. A soft, outer cover 26 may be provided surrounding the internal frame 22 and defining an exterior surface 28 of the guided soft target 20.

The soft, outer cover 26 may be made of various known materials to provide suitable weather resistance and aerodynamic features, while minimizing any potential damage to a subject vehicle. In various aspects, the soft, outer cover 26 may include portions provided with radar absorptive materials (RAM), radar reflective materials (RRM), or a combination of both materials to provide radar signatures appropriate of an actual vehicle so as to enable appropriate vehicle testing. Certain areas of the exterior surface 28 of the soft, outer cover 26 may be designed to represent areas indicative of headlamps 32 or tail lamps 34 of a vehicle. As such, the projector assembly 25 may be configured to direct light patterns 36 to the representative areas of the exterior surface 28 in order to provide realistic displays indicative of headlights, brake lights, turn signals, and the like. The projector assembly 25 may also direct light patterns to areas representative of a windshield or other window to represent one or more passengers in the vehicle. In this regard, different training situations can be presented.

With specific reference to FIG. 1C, in certain aspects, the frame 22 includes a plurality of spaced apart panels 24 that may be joined, fastened, or linked together, as well as removably coupled to a platform base of the mobile platform 30 using suitable fastening techniques. As shown, at least one panel 24a of the plurality of panels 24 is illustrated as defining an aperture 38. The projector assembly 25 may be configured to project light patterns 36 through the aperture 38 for visual display on the exterior 28 of the guided soft target. It may be desirable to provide a lens disposed within the aperture 38 (not specifically shown) that may be configured to magnify, focus, and/or direct the light patterns 36 to certain areas for visual display on the exterior 28 of the guided soft target 20. In this and other aspects, the frame 22 may include one or more translucent or transparent panels 24. In this regard, the projector assembly 25 may be configured to project light patterns 36 through at least one panel 24a for visual display on the exterior of the guided soft target. The panels 24 should be made of a suitable strength material such that they are able to provide the necessary support for the soft, outer cover 26, as well as not damage, or minimize any damage, to a subject vehicle. Various resins, structural foams, and thermoplastics can be used for the panels 24. The panels 24 can be monolithic components, or they can be made of a number of components joined together. In various aspects, 3-D printing or suitable additive manufacturing techniques can be used for custom designs of the panels. Although shown as having a generally continuous surface, the panels 24 can be designed in various other manners and, in some instances, the panels may only have an outer perimeter, or outer frame component.

Figure 2:
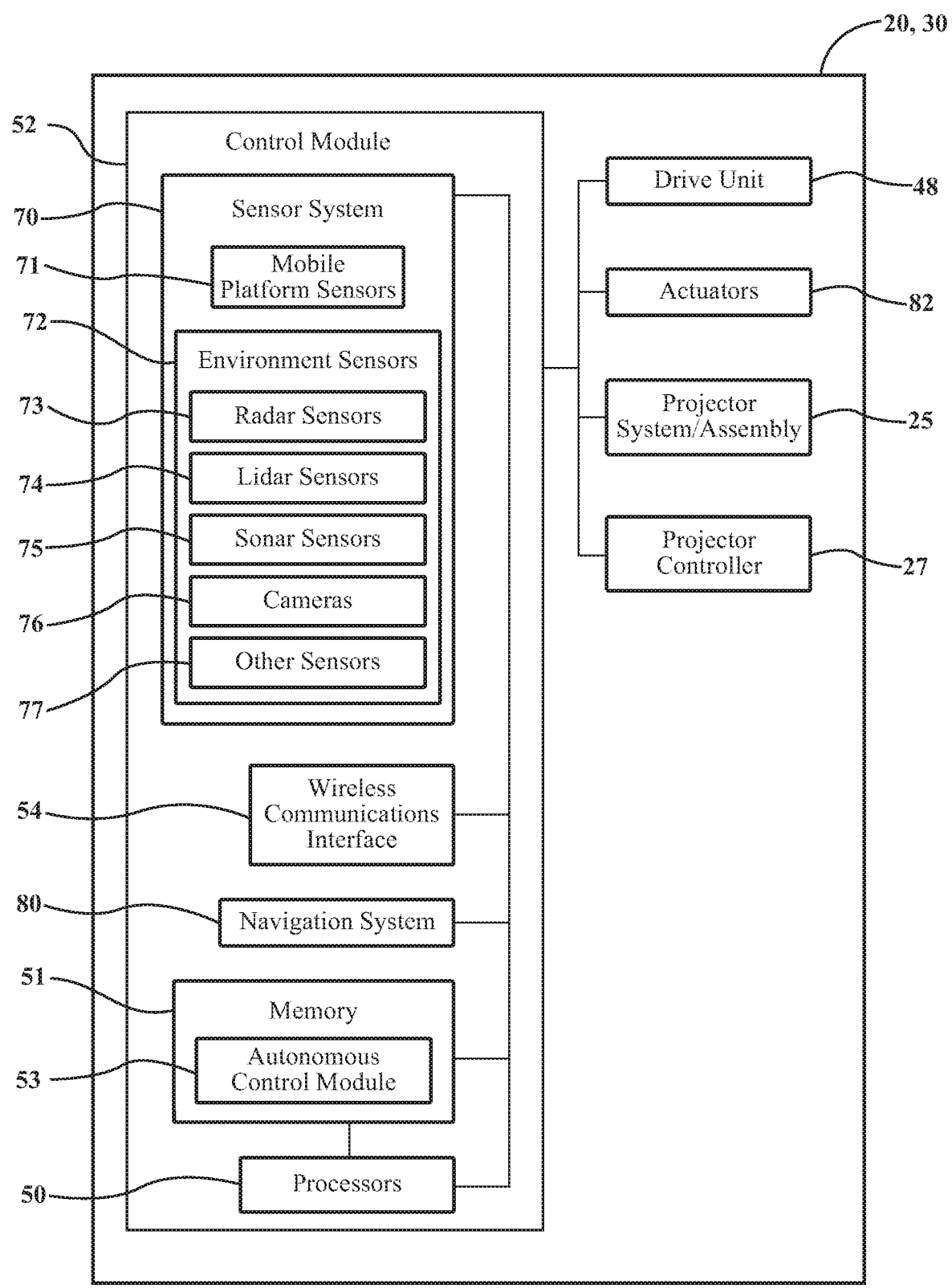
FIG. 2 is a schematic diagram illustrating an exemplary aspect of a guided soft target within which various systems and methods disclosed herein according to the present technology may be implemented.

FIG. 2 is a schematic block diagram showing various elements and systems for controlling operations of the guided soft target 20 and/or mobile platform 30, which can have any combination of the various elements shown therein. The guided soft target 20 and/or mobile platform 30 may have more or fewer elements and/or systems than shown, or may also include alternative elements and/or systems to those shown. In some arrangements, the guided soft target 20 and/or mobile platform 30 may be implemented without one or more of the elements shown in FIG. 2.

The mobile platform 30 can include one or more processors 50. Various elements of the control module 52 and the mobile platform 30 may communicate using a system bus. In one or more arrangements, the processor(s) 50 can be a main processor of the mobile platform 30. For instance, the processor(s) 50 can be an electronic control unit (ECU). The processor(s) 50 may be operably connected to other elements of the mobile platform for receiving information from the other elements and for issuing control commands to the other elements, to control or aid in controlling operations of the mobile platform. The terms "operably connected" and "operably coupled" as used throughout this description, can include direct or indirect connections, including connections without direct physical contact. The processor(s) 50 may be located in the control module 34 or outside the control module.

One or more memories 52 may be operably coupled to the processor(s) 50 for storing an autonomous control module 53 (described below), other modules, and any data and other information needed for diagnostics, operation, control, etc. of the mobile platform. The memories 51 may be one or more of a random-access memory (RAM), read-only memory (ROM), a hard-disk drive, a flash memory, or other suitable memory for storing the required modules and information. The memories may be located in the control module 52 or outside the control module.

Some or all operations of the mobile platform 30 may be autonomously controlled, for example, by one or more autonomous control module(s) 53. As used herein, "autonomous control" refers to controlling various aspects of the movement and/or other operations of the mobile platform 30 with minimal or no input from a human operator. In one or more embodiments, the mobile platform 30 is highly automated or completely automated. Generally, "module", as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium, such as memory 52. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In addition to the autonomous control module 53, one or more other modules (not shown) for other purposes may be incorporated into the mobile platform 30. Any of the modules can be implemented as computer-readable program code that, when executed by processor(s) 50, autonomously implement various mobile platform control functions. Such functions may include control of the various mobile platform systems described herein. One or more of the modules can be a component of the processor(s) 50, or one or more of the modules can be executed on and/or distributed among other processing systems to which the processor(s) 50 is operably connected. The modules can include instructions (e.g., program logic) executable by the one or more processor(s) 50. In one or more arrangements, one or more of the mobile platform modules can include artificial or computational intelligence elements, e.g., neural network, fuzzy logic or other machine learning algorithms. Further, in one or more arrangements, the functions of one or more of the modules can be distributed among a plurality of the modules described herein. In one or more arrangements, two or more of the modules can be combined into a single module.

The autonomous control module 53 and/or processor(s) 50 can be configured to receive data from the sensor system 70 and/or any other type of system or element capable of acquiring information relating to the mobile platform 30 and/or the external environment of the mobile platform 30. In one or more arrangements, the autonomous control module 53 and/or processor(s) 50 can use such data in controlling the mobile platform. The autonomous control module 53 can determine position and velocity of the mobile platform 30. The autonomous control module 53 can be configured to receive and/or determine location information for neighboring vehicles and other environmental features. Information acquired by the autonomous control module 53 may be used to determine the current state of the mobile platform 30 and/or to estimate position and orientation of the mobile platform 30 with respect to its environment. The autonomous control module 53 can control various operations of the mobile platform 30 either alone or in combination with processor(s) 50.

The autonomous control module 53 can be configured to determine travel path(s), current autonomous maneuvers for the mobile platform 30, future autonomous maneuvers and/or modifications to current autonomous maneuvers based on data acquired by the sensor system 70 and/or data from any other suitable source. "Autonomous maneuver" means one or more actions that affect the movement of the mobile platform 30. Examples of autonomous maneuvers include accelerating, decelerating, braking, turning, and/or reversing, just to name a few possibilities. The autonomous control module 53 can be configured to implement determined autonomous maneuvers. The autonomous control module 53 can cause, directly or indirectly, such autonomous maneuvers to be implemented. As used herein, "cause" or "causing" means to make, command, instruct, and/or enable an event or action to occur or at least be in a state where such event or action may occur, either in a direct or indirect manner. The autonomous control module 53 can be configured to execute various vehicle control functions and/or to transmit data to, receive data from, interact with, and/or control the mobile platform 30 and/or one or more systems thereof.

In one or more arrangements, some or all operations of the mobile platform 30 may be controlled remotely, for example, by radio control from a remote station (not shown). To enable wireless control of the platform 30, the platform may be provided with a wireless communications interface 54. In one or more embodiments, the mobile platform 30 is configured with one or more semi-autonomous operational modes in which one or more computing systems perform a portion of the navigation and/or maneuvering of the mobile platform, and a human operator provides inputs to the mobile platform to perform a portion of the navigation and/or maneuvering of the mobile platform 30.

In one or more arrangements, the drive unit control functions may be separable from other control functions so that, for example, the drive unit may be controlled remotely while other operations of the mobile platform may be controlled autonomously by the control module.

As noted above, the mobile platform 30 can include the sensor system 70. The sensor system 70 can include one or more sensors. "Sensor" means any device, component and/or system that can detect, and/or sense something. The one or more sensors can be configured to detect, and/or sense in real-time. As used herein, the term "real-time" means a level of processing responsiveness that system senses as sufficiently immediate for a particular process or determination to be made, or that enables the processor to keep up with some external process.

In arrangements in which the sensor system 70 includes a plurality of sensors, the sensors can function independently from each other. Alternatively, two or more of the sensors can work in combination with each other. In such a case, the two or more sensors can form a sensor network. The sensor system 70 and/or the one or more sensors can be operably connected to the processor(s) 50, control module 53 and/or another element of the mobile platform 30 (including any of the elements shown in FIG. 3).

The sensor system 70 can include any suitable type of sensor. Various examples of different types of sensors are described herein. However, it will be understood that the embodiments are not limited to the particular sensors described. The example sensors may include one or more environment sensors 72 and/or one or more mobile platform sensors 71. However, it will be understood that the embodiments are not limited to the particular sensors described.

The mobile platform sensor(s) 71 can detect, determine, and/or sense information about the mobile platform 30 itself. In one or more arrangements, the mobile platform sensor(s) 71 can be configured to detect, and/or sense position and orientation changes of the mobile platform 30, such as, for example, based on inertial acceleration. The mobile platform sensor(s) 71 may include one or more sensors configured to detect position and motion parameters of the mobile platform 30. In one or more arrangements, the mobile platform sensor(s) 71 can include one or more accelerometers, one or more gyroscopes, an inertial measurement unit (IMU), a dead-reckoning system, a global navigation satellite system (GNSS), a global positioning system (GPS), a navigation system 80, and/or other suitable sensors. In one or more arrangements, the mobile platform sensor(s) 71 can include a speedometer to determine a current speed of the mobile platform 30. Mobile platform sensors 71 may include sensors configured to detect conditions indicative of a collision between the mobile platform 30 and a subject vehicle.

Environment sensors 72 may be configured to acquire, and/or sense mobile platform environment data. "Mobile platform environment data" includes data and/or information about the external environment in which the mobile platform is located. For example, the one or more environment sensors 72 can be configured to detect, quantify and/or sense vehicles and/or obstacles in at least a portion of the external environment of the mobile platform 30 and/or information/data about such vehicle and/or obstacles. Such obstacles may be stationary objects and/or dynamic objects. Sensor system 70 may include one or more sensors configured to detect position and motion parameters of a subject vehicle in an external environment of the mobile platform 30. Environment sensors 72 may include sensors configured to detect conditions indicative of a pending collision between the mobile platform 30 and a subject vehicle.

The one or more environment sensors 72 can be configured to detect, measure, quantify and/or sense other things in the external environment of the mobile platform 30, such as, for example, vehicles, lane markers, signs, traffic lights, traffic signs, lane lines, crosswalks, curbs proximate the mobile platform 30, off-road objects, etc. As an example, in one or more arrangements, the sensor system 70 can include one or more radar sensors 73, one or more LIDAR sensors 74, one or more sonar sensors 75, and/or one or more cameras 76. In addition, other types of sensors 77 may be incorporated into the sensor system 70 for various purposes, depending on the specific test requirements and operational requirements of the mobile platform 30.

The mobile platform 30 can include one or more actuators 82. The actuators 89 can be any element or combination of elements operable to modify, adjust and/or alter one or more of the mobile platform systems or components thereof responsive to receiving signals or other inputs from the processor(s) 50 and/or the autonomous control module 53. Any suitable actuator can be used. For instance, the one or more actuators 82 can include motors, pneumatic actuators, hydraulic pistons, relays, solenoids, and/or piezoelectric actuators, just to name a few possibilities.

The systems, components and/or processes described above can be realized in hardware or a combination of hardware and software. They can be realized in a centralized fashion in one processing system or in a distributed fashion where different elements are spread across several interconnected processing systems. Any kind of processing system or other apparatus adapted for carrying out the methods and/or operations described herein is suited. A typical combination of hardware and software can be a processing system with computer-usable program code that, when being loaded and executed, controls the processing system such that it carries out the methods and/or operations described herein. The systems, components and/or processes also can be embedded in a computer-readable storage, such as a computer program product or other data programs storage device, readable by a machine, tangibly embodying a program of instructions executable by the machine to perform methods and/or operations described herein. These elements also can be embedded in an application product which comprises all the features enabling the implementation of the methods described herein and, which when loaded in a processing system, is able to carry out these methods.

Furthermore, arrangements and/or operations described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 3:
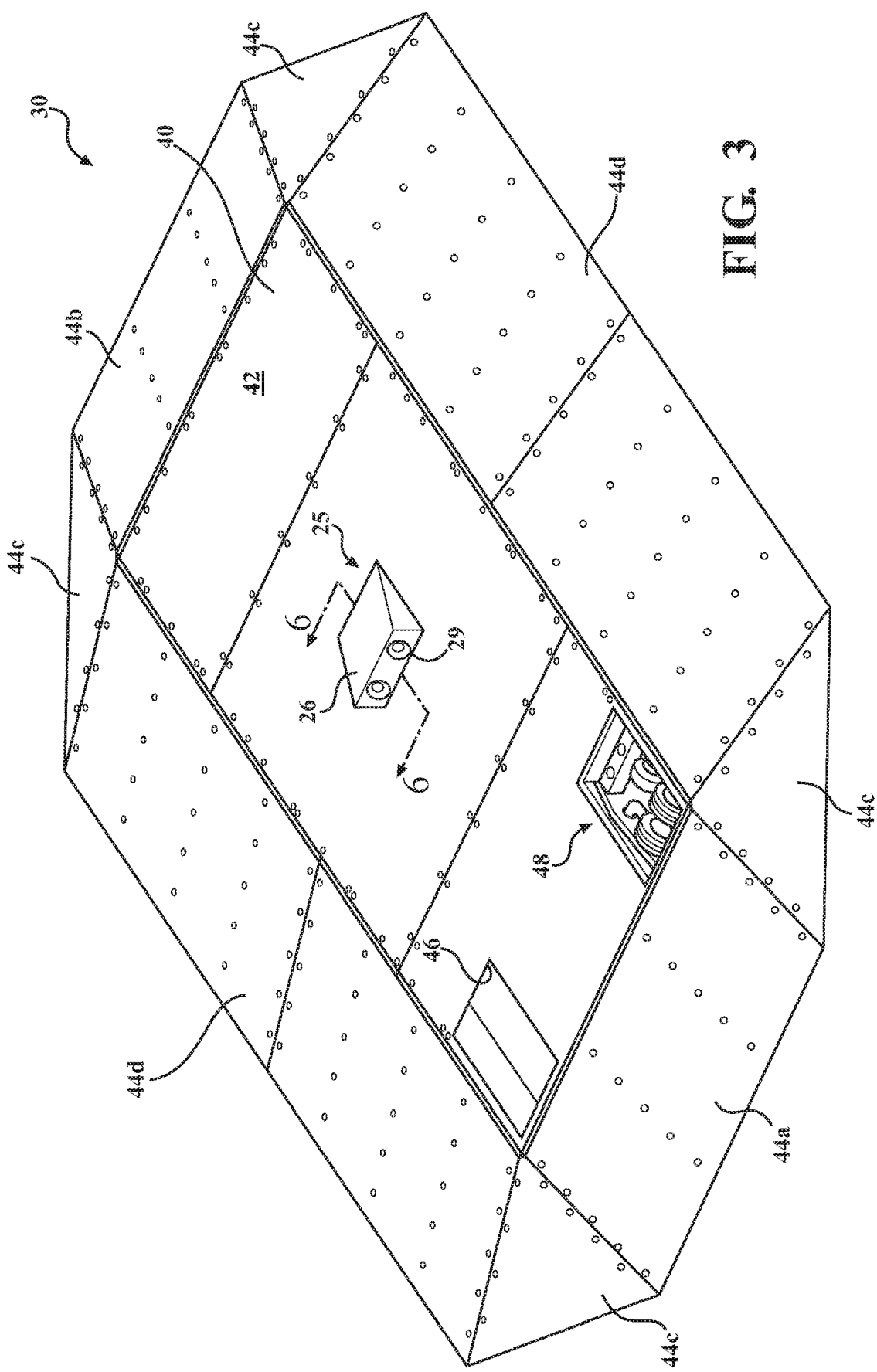
FIG. 3 is an isometric side view of a mobile platform that can be used with the guided soft target as shown in FIGS. 1A-1C.
Figure 4:
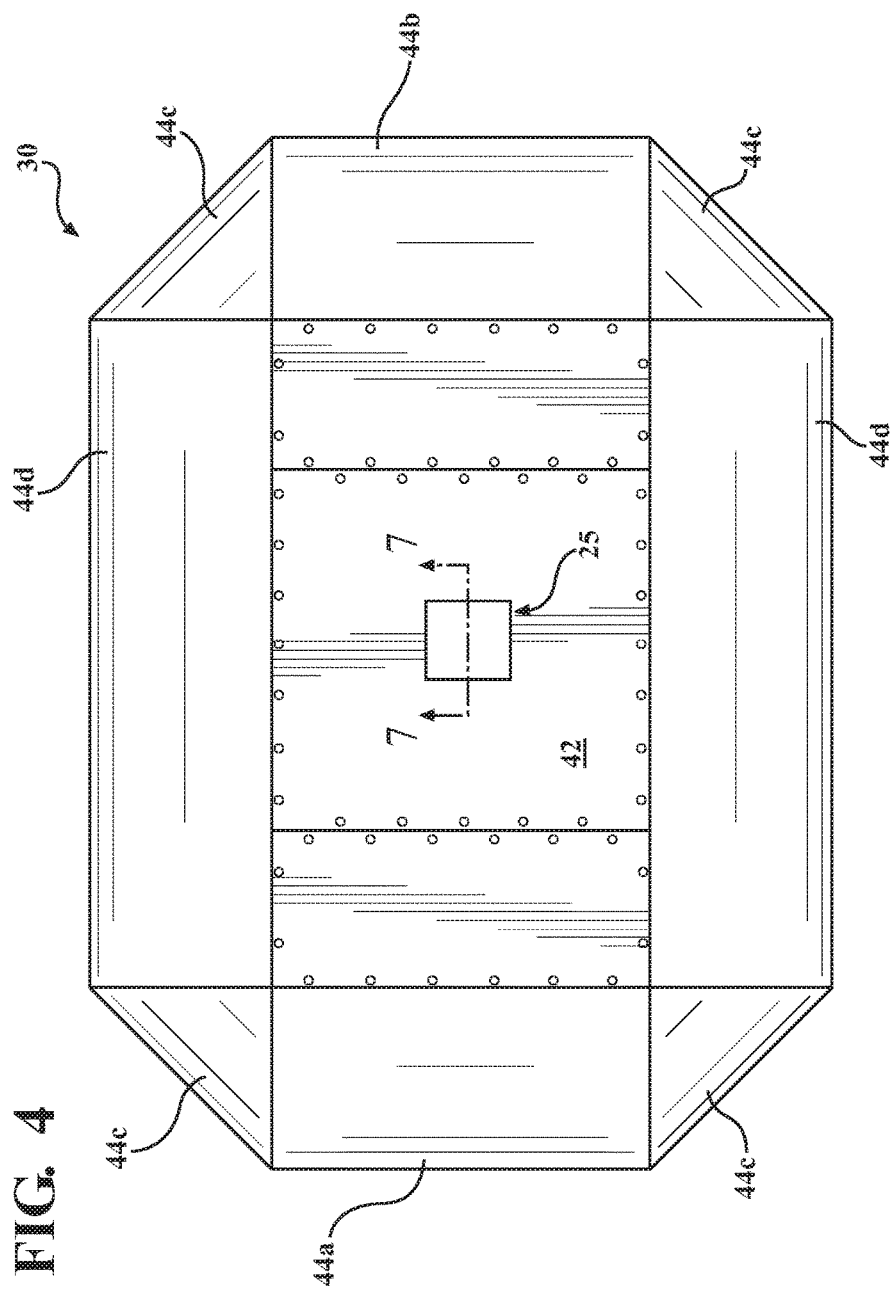
FIG. 4 is a top plan view of the mobile platform as shown in FIG. 1B.
Figure 5:
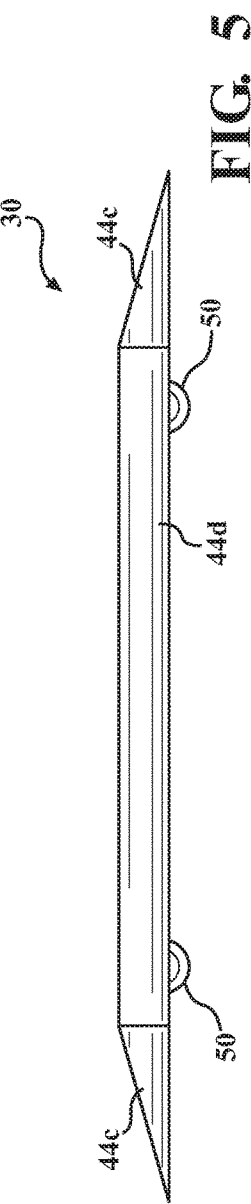
FIG. 5 is a side plan view of the mobile platform as shown in FIG. 4.

FIG. 3 is an isometric view of an exemplary mobile platform 30 structured for mounting framing and other components of a guided soft target thereon. FIG. 4 is a top plan view of the mobile platform as shown in FIG. 1B, and FIG. 5 is a side plan view of the mobile platform as shown in FIG. 4. The mobile platform 30 is preferably designed and suitably structured to enable a subject vehicle to drive onto a platform base 40 (or other upper surface or portion thereof) of the mobile platform 30 without damage to either the mobile platform 30 or the subject vehicle. A "subject vehicle" may be a vehicle undergoing testing that involves operation of the subject vehicle in the environment of the guided soft target 20 and/or mobile platform 30 and which may involve collision or contact with the same. The subject vehicle may be a conventional motor vehicle, such as a passenger vehicle. The guided soft target 20, or just the mobile platform 30 alone, may be configured to operate autonomously in the same environment as the subject vehicle, where the guided soft target 20 and subject vehicle may interact. In other aspects, the guided soft target 20 and/or the mobile platform 30 operate using remote controls so as to interact with the subject vehicle. In certain aspects, some or all of the operations may be controlled remotely, for example, by radio control from a remote station (not shown), or through wireless communications. As shown in FIG. 3, the mobile platform 30 may include a platform base 40 defining an upper surface 42. Front 44a, rear 44b, corner 44c, and opposing side portions 44d may be provided coupled to the platform base 40, optionally providing an angled surface upon which the subject vehicle can travel over in a collision. One or more of the platform base 40 and side portions 44 may define an internal cavity 46 configured for receiving various systems and components dedicated to propelling, stopping, guiding, and otherwise operating the guided soft target 20. Removable covers can be provided to enclose and protect the cavities 46.

FIG. 3 illustrates the mobile platform 30 including at least one self-propelled drive unit 48 configured to move along a ground surface responsive to a control signal. The drive unit 32 may be any self-propelled device capable of moving along the road surface in any of a variety of directions responsive to control commands as described herein. The drive unit 48 may include one or more wheels 50 to enable the movement. Various types of wheels 50 may be provided, including drive wheels, turning/steering wheel, and non-driving or stationary wheels. In various aspects, one or more wheels may be configured to retract within the mobile platform 30 responsive to an application of a threshold force on the wheel mountings. A power source (not shown), a drive train coupling the power source to the wheel(s), electronics (also not shown) needed to receive process command signals, and any other components needed to enable the drive unit 48 to move along the road surface as described herein. The mobile platform 30 may also include a control module 52 in communication with the drive unit 48 so as to provide instructions to the drive unit 48, as well as other systems.

The projector assembly 25 may be configurable to be remotely controllable, for example, using projector controller 27 (FIG. 2). The terms "remote control", "remotely controllable", and "remotely generated control signal" relate to control signals or commands generated by a source external of the mobile platform 30. In addition to being configured to receive and respond to control commands from the control module 52, embodiments of the mobile platform 30 may be configured to move responsive to commands generated by a command source (for example, from the projector controller 27 or another remote control station exterior of the mobile platform 30).

The projector assembly 25 may be configurable to receive control commands from the mobile platform control module 52, from a remote source (i.e., a source, such as a remote facility or a remotely located user external of the mobile platform), or from another source. Thus, in one or more arrangements, the control module 52 may be configured to generate commands directed to controlling the projector assembly 25, the projector assembly 25 may be configured to be controllable to move responsive to commands received from the control module 52, and the control module 52 may be in operable communication with the projector assembly 25.

Electrical/electronic connections between the control module 52 and the projector assembly 25 may be via separable or "breakaway" mateable connectors (not shown) that are structured to remain in a mated condition during normal operation of the mobile platform, but which may be easily separable during a collision between the mobile platform and a subject vehicle, to aid in preventing damage to the control module 52, projector assembly 25, and/or other components. Alternatively, the projector assembly 25 and the control module 52 may be configurable for wireless communication.

Figure 6:
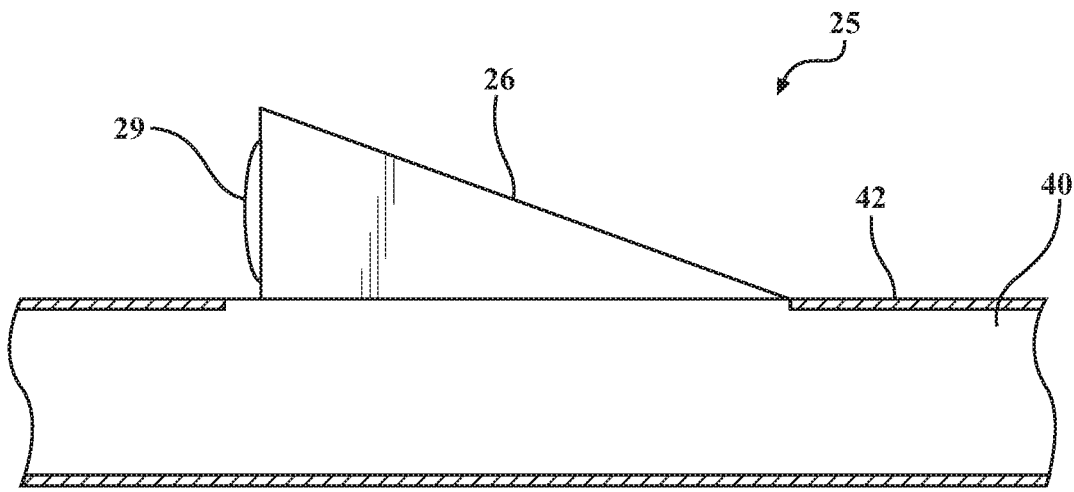
FIG. 6 is a simplified partial cross-sectional view of an exemplary projector assembly taken along the line 6-6 of FIG. 3, shown in an extended use position.
Figure 7:
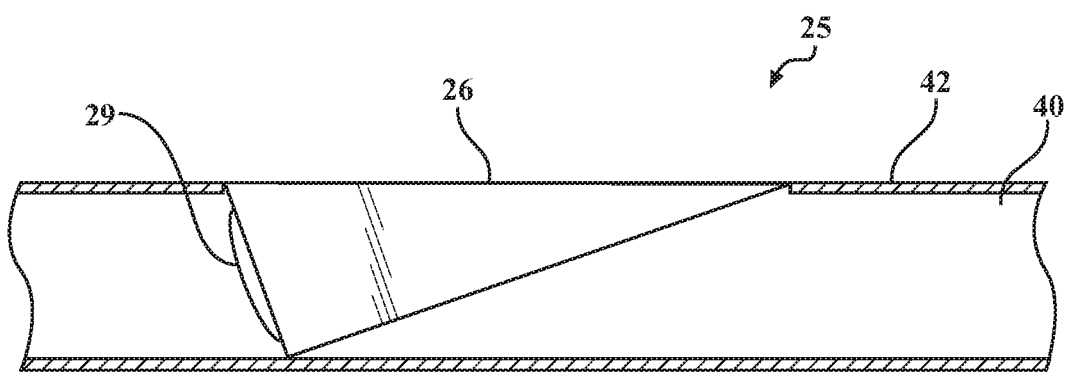
FIG. 7 is a simplified partial cross-sectional view of an exemplary projector assembly taken along the line 7-7 of FIG. 4, shown in a retracted storage position located within an interior of the platform base.

FIG. 6 is a simplified partial cross-sectional view of an exemplary projector assembly 25 taken along the line 6-6 of FIG. 3, shown in an extended use position. FIG. 7 is a simplified partial cross-sectional view of an exemplary projector assembly 25 taken along the line 7-7 of FIG. 4, shown in a retracted storage position located such that most or all of the projector assembly is safely located within an interior/cavity of the platform base 40. In various aspects, the projector assembly 25 is built into an interior of the platform base 40 and is movable between the extended use position and retracted storage position, with the movement being actuated by one or more processor, controller, or control module 52. Generally, the projector assembly 25 is configured to provide various visual patterns, including still light patterns and patterns representative of moving images, with any combination of colors. In certain aspects, the visual patterns may include certain displays of light that serve as distinct notifications or communications with the subject vehicle or other device.

The projector assembly 25 may be provided with various crash detection capabilities and be configured to retract into a safe position based on certain sensor readings or signals. A sliding protective cover may also be provided for use with the projector assembly 25. The projector assembly 25 may be provided as a modular unit that can be removed and/or replaced as necessary. The projector assembly 25 can also be coupled to an upper surface 42 of the platform base 40.

The projector assembly 25 may include a projector housing 26 that contains the various projector components, such as lights, lenses, sensors, processors, power sources, and any other mobile platform or control element that may be described herein. In various aspects, the projector housing 26 has a substantially planar upper surface and may be designed to provide a weather resistant barrier to the outside environment. The projector housing 26 may define at least one aperture 29 for projecting light patterns there through. In one or more alternate aspects, the projector housing 25 may have a hemispherical or "dome" shape. This may allow for the movement of projector components and items disposed therein. Such a shape may also provide additional protection from collisions with the subject vehicle. The projector assembly 25 may be configured to be re-usable after collision or other physical contact between the mobile platform 30 and a subject vehicle.

The projector housing 26 may be hardened to aid in preventing damage to the components contained therein. The term "hardened" as applied to the projector housing 26 means that the overall projector assembly 25 may be structured to enable at least one wheel of a subject vehicle to drive up along a side of the projector housing 26, or onto, along, and over a top surface the projector housing with minimal or no damage to the projector components, sensors, processors, and other control elements or components contained within the projector housing 26, due to a wheel driving along the housing.

The term "hardened" also signifies that the projector housing 26 may be structured to withstand contact with a moving subject vehicle with minimal or no damage to any control module sensors and other components that may be contained within the projector housing 26. To this end, the hardened projector housing 26 may incorporate internal cushioning, suspension elements, and/or other features inside the projector assembly 25 that are configured to aid in preventing and/or minimizing damage (due to impact forces, for example) to the sensors and other components mounted in the projector housing 26. In this regard, the projector housing 26 may be formed from any suitable material, for example, a steel or hardened metal or alloy.

Figure 8:
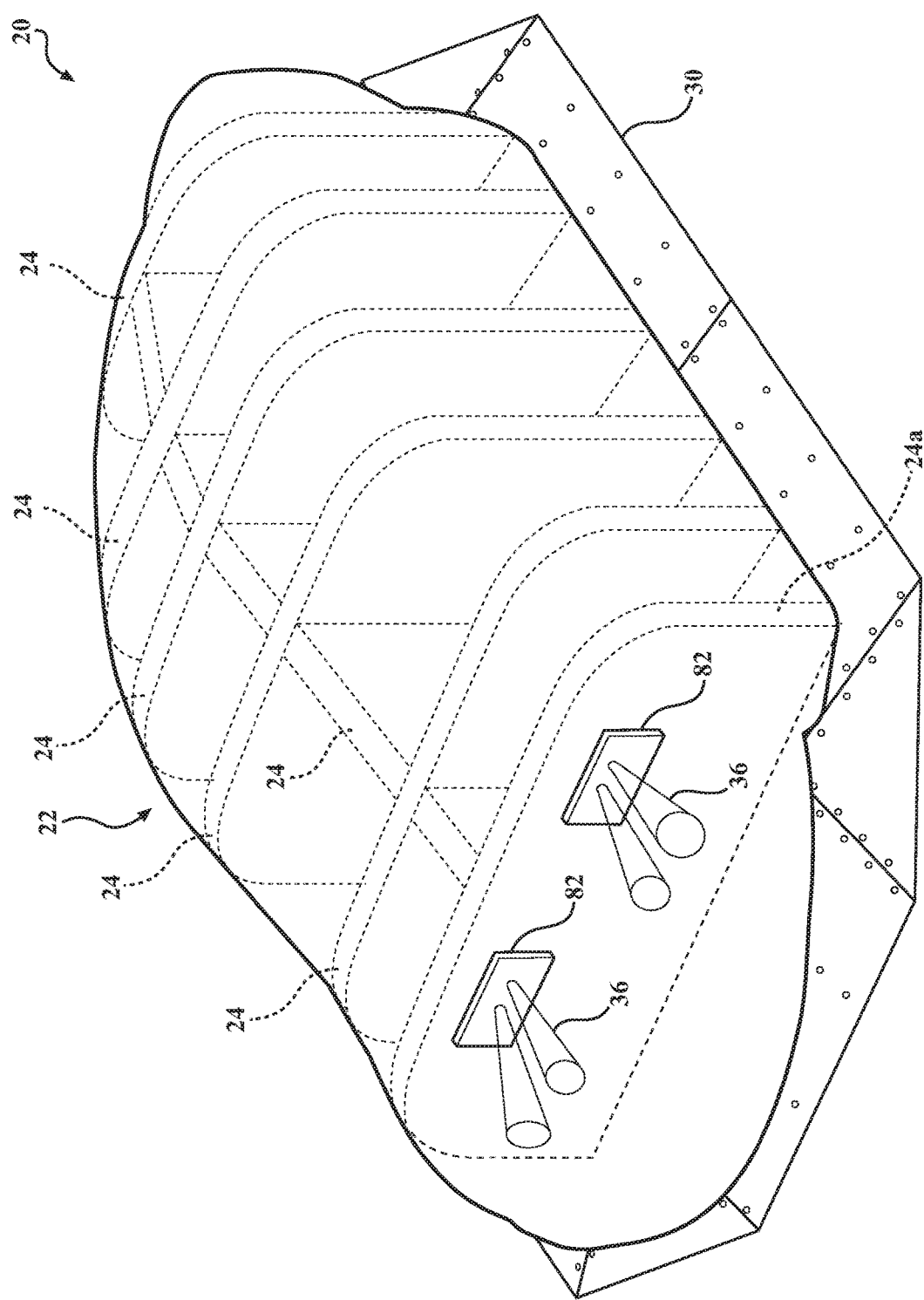
FIG. 8 is an isometric side view of the guided soft target of FIG. 1A, illustrating a plurality of projector units coupled to a panel of the internal frame.

FIG. 8 is an isometric side view of the guided soft target of FIG. 1A, illustrating the projector assembly provided as having a plurality of separate projector units 84 coupled to at least one panel 24a of the internal frame 22. Although only two projector units are specifically shown in FIG. 8 for simplicity, the number and location of the projector units 84 may vary based on the desired use. In certain aspects, the projector assembly may include a plurality of projector units, with each projector unit being coupled to a different panel in order to display a light pattern to a different location on the exterior 28 of the guided soft target 20. The projector units 84 may be removably coupled to the panels 24 for ease of removal and relocation. The projector units 82 may be wired to a control module or provided with wireless communication. The projector units 82 may be provided with their own power supply and may include a hardened housing for protection.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A mobile platform for a guided soft target, the mobile platform comprising:
   a platform base onto which a subject vehicle is non-damagingly drivable;
   a drive unit configured to move the platform base along a ground surface; and
   a projector assembly located on and coupled to the platform base and configured for projecting light patterns for visual display onto an exterior of the guided soft target, the light patterns configured to simulate at least one of a headlight, a turn signal, and a brake light.

2. The mobile platform according to claim 1, wherein the projector assembly comprises a hardened housing defining at least one aperture for projecting the light patterns.

3. The mobile platform according to claim 1, wherein the projector assembly is located on and coupled to an upper surface of the platform base.

4. The mobile platform according to claim 1, wherein the projector assembly is selectively movable between an extended use position and a retracted storage position located within an interior of the platform base.

5. The mobile platform according to claim 1, wherein the projector assembly comprises a control module that is configured to be remotely controllable.

6. A guided soft target, comprising:
   a platform base onto which a subject vehicle is non-damagingly drivable;
   a drive unit configured to move the platform base along a ground surface;
   a frame removably coupled to the platform base;
   an outer cover disposed over the frame and defining an exterior surface of the guided soft target; and
   a projector assembly configured for projecting light patterns for visual display onto the exterior surface of the guided soft target.

7. The guided soft target according to claim 6, wherein the projector assembly is located on and coupled to the platform base.

8. The guided soft target according to claim 7, wherein the frame comprises a plurality of panels, further wherein at least one panel of the plurality of panels defines an aperture, and the projector assembly is configured to project light patterns through the aperture for visual display onto the exterior surface of the guided soft target.

9. The guided soft target according to claim 8, further comprising a lens disposed in the aperture, wherein the projector assembly is configured to project light patterns through the lens for visual display onto the exterior surface of the guided soft target.

10. The guided soft target according to claim 7, wherein the frame comprises a plurality of translucent or transparent panels, and the projector assembly is configured to project light patterns through at least one panel of the plurality of translucent or transparent panels for visual display onto the exterior surface of the guided soft target.

11. The guided soft target according to claim 6, further comprising a control module that is configured to be remotely controllable.

12. The guided soft target according to claim 11, wherein the control module is configured to generate commands directed to both (1) controlling movement of the drive unit, and (2) controlling the projector assembly for projecting light patterns for visual display onto the exterior surface of the guided soft target.

13. The guided soft target according to claim 11, further comprising one or more processors and a memory communicably coupled to the one or more processors and storing the control module including instructions that, when executed by the one or more processors, cause the one or more processors to generate a control command resulting in operation of the projector assembly for projecting light patterns for visual display onto the exterior surface of the guided soft target.

14. The guided soft target according to claim 6, wherein the frame comprises a plurality of panels, further wherein the projector assembly is located on and coupled to one panel of the plurality of panels and is configured for projecting light patterns for visual display onto the exterior surface of the guided soft target.

15. The guided soft target according to claim 14, wherein the projector assembly comprises a plurality of projector units, each projector unit being located on and coupled to a different panel of the plurality of panels.

16. The guided soft target according to claim 6, wherein the projector assembly comprises a hardened housing defining at least one aperture for projecting the light patterns.

17. The guided soft target according to claim 6, wherein the projector assembly is selectively movable between an extended use position and a retracted storage position located within an interior of the platform base.

18. A method for displaying lighting on an exterior of a guided soft target, the method comprising:
   providing a projector assembly disposed within an interior of the guided soft target;
   receiving, at a control module, instructions for directing an output display of a light pattern; and
   instructing, using the control module, the projector assembly to project the light pattern for visual display onto the exterior of the guided soft target.

19. The method according to claim 18, wherein the guided soft target comprises a plurality of panels forming an interior frame and at least one panel of the plurality of panels defines an aperture, and the step of instructing the projector assembly comprises an instruction to project the light pattern through the aperture for visual display onto the exterior of the guided soft target.

20. The method according to claim 18, wherein the guided soft target comprises a plurality of translucent or transparent panels forming an interior frame, and the step of instructing the projector assembly comprises an instruction to project the light pattern through at least one panel of the plurality of translucent or transparent panels for visual display onto the exterior of the guided soft target.

* * * * *